Oct. 30, 1951     I. E. SWART     2,573,625
ADVERTISING DEVICE

Filed April 29, 1947     2 SHEETS—SHEET 1

INVENTOR.
Ira E. Swart
BY Theodore E. Simonton
ATTORNEY

Oct. 30, 1951  I. E. SWART  2,573,625
ADVERTISING DEVICE
Filed April 29, 1947  2 SHEETS—SHEET 2
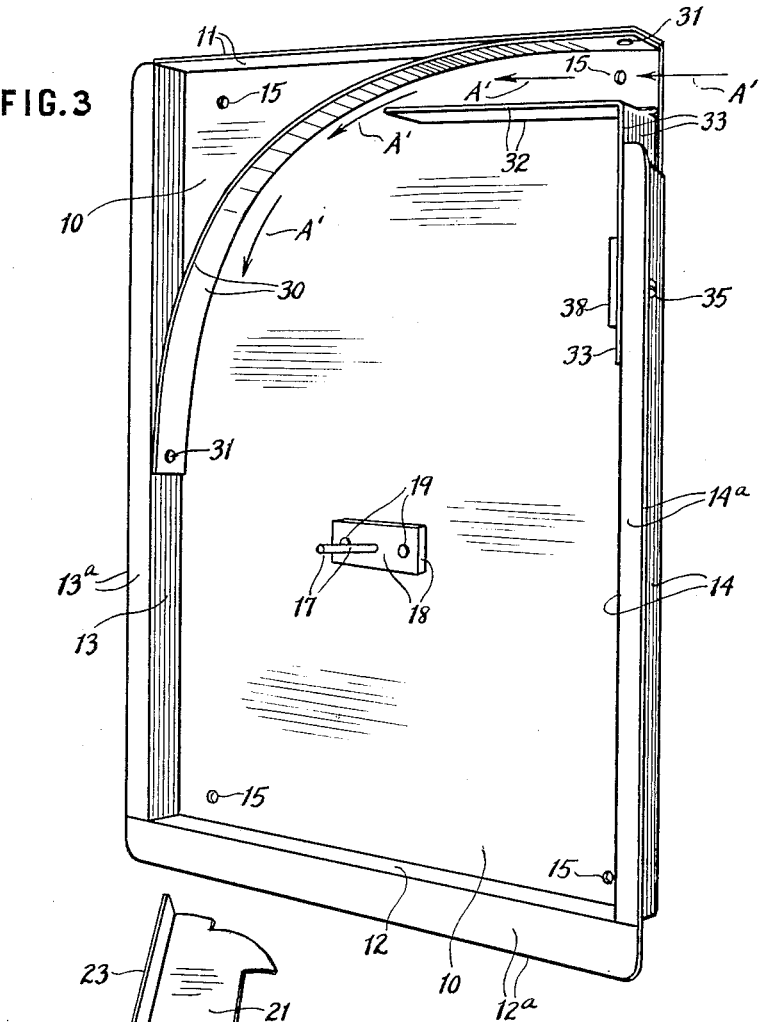
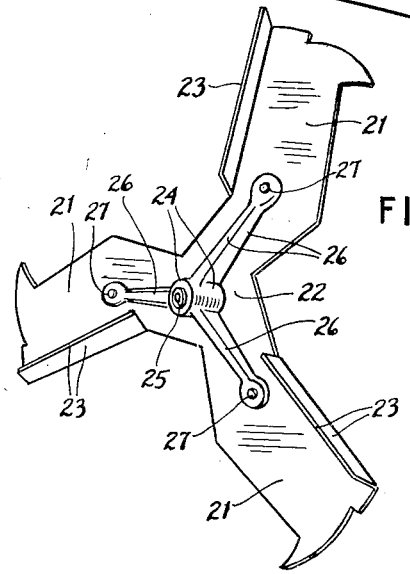
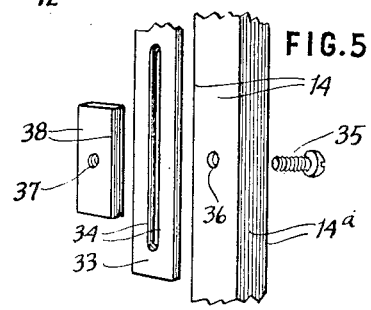
INVENTOR.
Ira E. Swart
BY
Theodore E. Simonton
ATTORNEY Patented Oct. 30, 1951

2,573,625

UNITED STATES PATENT OFFICE 2,573,625

ADVERTISING DEVICE

Ira E. Swart, Syracuse, N. Y.

Application April 29, 1947, Serial No. 744,621

4 Claims. (Cl. 40—39)

The principal object of the invention is to provide an efficient and attractive advertising device which is of simple, practicable and inexpensive construction.

A further object of the invention is to provide a device of the class above set forth adapted for mounting thereof upon a motor driven or other vehicle and constructed for efficient operation of a movable portion thereof by air draft or pressure caused by propulsion of the vehicle.

A further object of the invention is to provide a device of the class above set forth having simple and efficient means for controlling the driven speed of an air driven portion of the device.

A further object of the invention is to provide a device of the class set forth having fixed means and movable and preferably air driven means coactive with said fixed means to simulate an object or thing, such as a human being, in motion, and arranged in a simple and effective manner for attractive and efficient attention-attracting operation.

Other objects and advantages of the invention will appear from the following description in detail of the preferred embodiment of the invention illustrated in the accompanying drawings.

In the drawings:

Figure 3 is a perspective view of the rear part of the device with the front part and air driven rotor hereinafter described removed from said rear part;

Figure 4 is a perspective view of the air driven rotor of the device as viewed from the rear thereof; and Figure 5 is a detail exploded perspective view of parts of the device coactive as hereinafter described for adjustment of one of said parts to control the speed of rotation of the rotor.

Figure 1:
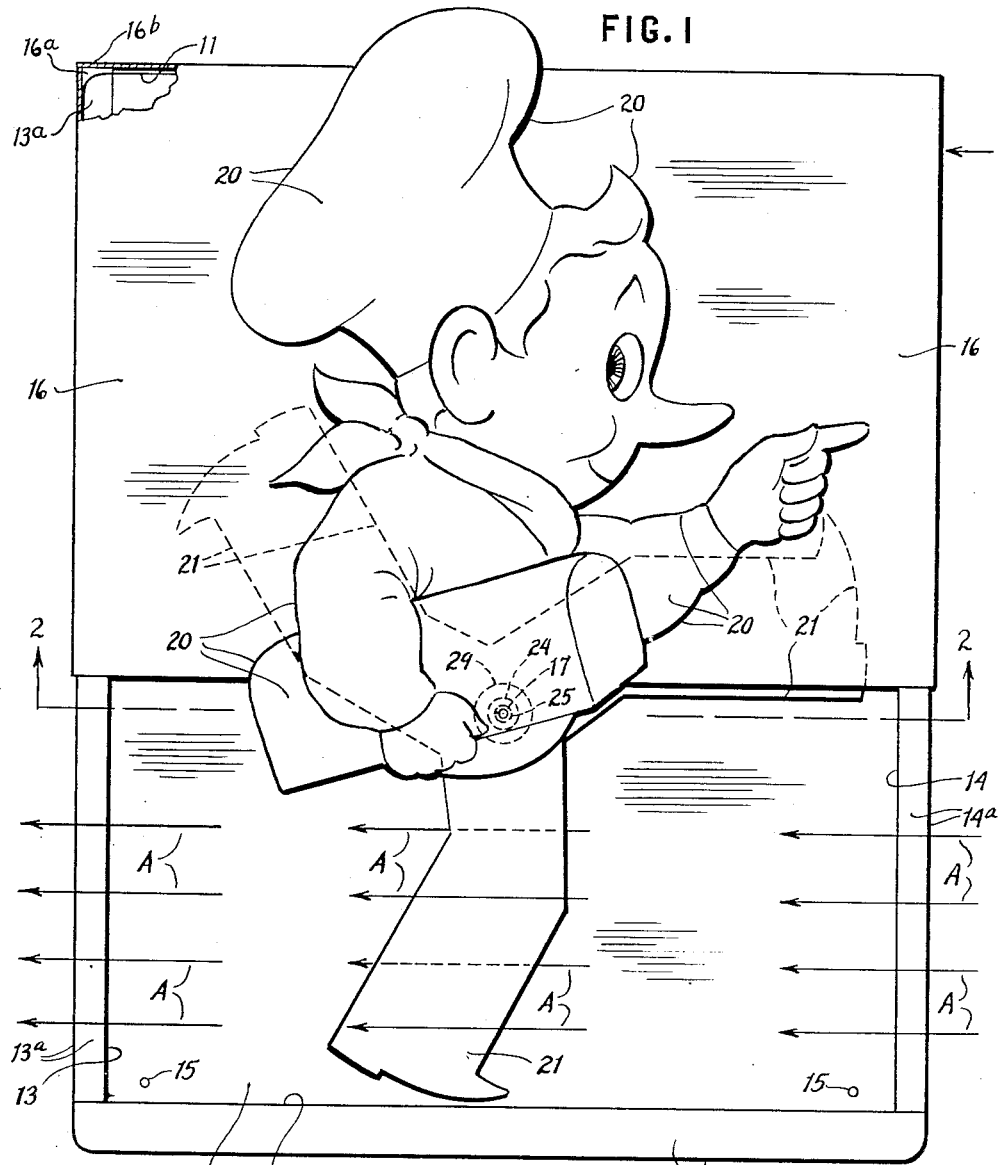
Figure 1 is a front elevation of the advertising device.
Figure 2:
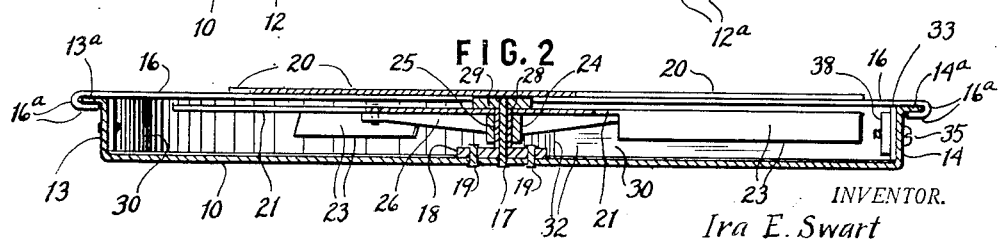
Figure 2 is a sectional view on the line 2—2 of Figure 1.

It will be understood that the embodiment of the invention shown in the drawings and hereinafter described is illustrative and may be varied, the invention consisting in the features of construction and arrangements and combinations of parts particularly pointed out in the appended claims.

The device shown is preferably formed of metal. It has a rear part of flat, rectangular and open-front box-like form having a flat rectangular rear wall 10, extending forwardly from the edges of which are two parallel and straight top and bottom walls 11 and 12 each extending the full width of the rear wall, a straight side wall 13 extending to the top and bottom walls, and a straight side wall 14 extending from the bottom wall 12 to a point short of the top wall 11, the side walls also being parallel, and the top, bottom and side walls being normal to the rear wall. The side walls 13 and 14 are formed throughout their lengths with flanges 13ª and 14ª which extend outwardly from the front edges of said walls parallel to the rear wall. Preferably, as shown, the bottom wall 12 has extending downwardly from its front edge a flange 12ª which lies in the same plane as flanges 13ª and 14ª and extends to the outer edges of said flanges 13ª and 14ª. Preferably for attachment of the device in upright position to a side of a vehicle at the outer side of the vehicle, the rear wall 10 is formed with holes 15 adjacent the four corners thereof for passage of fastening screws or bolts through said rear wall.

The device shown has a detachable and imperforate front or cover part which is adapted to close the open face of the rear part of the device part way from the top of said rear part toward the bottom of said rear part. This front or cover part of the device has a flat and rectangular front wall 16 which has rearwardly and inwardly turned side flanges 16ª for slidably receiving flanges 13ª and 14ª of the rear part of the device and also has along its top edge a rearwardly extending flange 16ᵇ for seating on the top of wall 11 of the rear part of the device. The front or cover part of the device may thus be slid vertically onto and off of the rear part of the device. The depth of the front or cover part is such that its lower edge is substantially above the bottom wall 12 when the front part is fully applied to the rear part. In the construction shown, the cover closes the open front of the rear part from the top to slightly more than half way to the bottom of said open front.

A bearing post or stub staft 17 for journaling an air drivable rotor extends forwardly from the rear wall 10 of the rear part of the device and is fixedly connected at its rear end with said wall. This post or shaft extends normal to wall 10 and is located preferably, as shown, equidistant from walls 12, 13 and 14 of the rear part of the device, with the front end of the shaft adjacent the lower edge of the applied cover part of the device. Preferably, the rear end of the post is fixed in a block 18 fixed to the front face of wall 10 by rivets 19.

The rotor journaled on post 17 is constructed to be partly covered by the cover part and to be partly exposed to view through the opening between the lower edge of the cover part and wall 12 of the rear part. The rotor has a plurality of impeller blades arranged for rotation of the rotor by air pressure directed transversely of the device across the opening between the cover part and wall 12 of the rear part of the device and may be given various forms. While the rotor may be impelled by air directed across the device by any suitable means, such as an electric motor driven fan, the device is particularly adapted for fastening thereof in an upright position against the outer side of a side wall of a motor vehicle or the like with the edge wall 14 nearest the front of the vehicle for rotation of the rotor by air which flows across the device in the direction of the arrows A (Figure 1) during advance travel of the vehicle. Rotation of the rotor may be effected by other means than those above described and is utilized to attract attention to the device by means driven by, and preferably, as shown, forming part of the rotor, said means preferably being arranged for coaction with a display or advertising means carried at the outer face of the cover part of the device, as, for example, by said means on the cover part and said means on the rotor being arranged to simulate different parts of a human being or other thing.

In the device shown, the imperforate cover part carries at its outer face in fixed relation thereto a sign which is a representation of a human being which is complete except for the legs. This representation of a portion of a human being in the construction shown is in the form of a metal plate silhouette 20 welded or otherwise fixed to the cover part at the outer face of said part, although obviously the representation may be painted or otherwise depicted or formed on the cover member.

Also, in the construction shown, the device is intended to simulate a running person when the rotor is turned, the rotor comprising a sign in the form of a flat plate which is cut out to provide three equally spaced human-leg-simulating portions 21 radiating from a central portion 22. Each of the portions 21 of the rotor is formed with a straight impeller blade 23 normal to the rotor plate 21—22 and to wall 10 and wall 16 and extending rearward part way to wall 10, each blade extending substantially radially of the axis of the rotor along the rear edge of the leg-simulating portion 21 on which it is formed and being thus behind and at least substantially concealed thereby. Fixed to the rotor plate 21—22 and located at the rear thereof is a three-armed stiffening spider having a bearing hub 24 located centrally of part 22 of the rotor plate and normal thereto. The hub of the spider has a lining sleeve 25 fixed therein, and each arm 26 of the spider extends longitudinally of and under a different one of the leg-simulating parts of the rotor and is fixed thereto by a rivet 27. The rotor plate 21—22 has a central aperture 28 for free passage therethrough of post 17.

The rotor is journaled on post 17 with bearing sleeve 25 abutting block 18. The lower part of the figure-simulating plate 20 on cover part 16 closely overlies the front or outer end of post 17 and covers that part of the central portion 22 of rotor plate 21—22 which would otherwise be visible below the lower edge of the cover part of the device. A spacing washer 29 is slipped on the post 17 between the rotor plate 21—22 and that part of the figure-simulating plate 20 which protrudes below the lower edge of the cover part 16.

The cover part 16 and the plate 20 fixed thereto form a removable cover means for so partially covering the rotor that no more than two of the leg-simulating elements of the rotor, or parts thereof, are visible simultaneously from the front of the device while the cover means is fully applied. This cover means is readily removable by sliding it upward off the rear part of the device in which the rotor is mounted, and while the covering means is thus removed, the rotor may be readily removed from or slipped onto the bearing post 17. While the covering means is in place, it holds the rotor on the bearing post against any substantial axial movement. No air, or substantially no air, directed horizontally across the open face of the device will, when the device is assembled and supported in upright position, be effective on the rotor above the level of the hub of the rotor. Some of the air so directed will pass over the front of and some behind any parts of the rotor plate exposed through the front opening, and such air will act on the impeller blades on the exposed or partially exposed leg-simulating parts of the rotor to turn the rotor clockwise as viewed in Figure 1 during advance of a vehicle upon which the device is mounted as above described, so that the simulated person will appear to be running in the direction of advance of the vehicle.

The device shown is provided with adjustable means for controlling the speed of rotation of the rotor. As above described, the right hand side wall 14 of the rear part of the device has its upper end spaced from the adjacent or right hand end of top wall 11 of said part of the device thus providing an air inlet at the upper right hand corner of the device in the leading or right hand edge of the device. Curving downward and to the left from the right hand end of wall 11 to wall 13 is an arcuate air deflector or wall 30 which is fixed to walls 11 and 13 by rivets 31. The lower end of wall 30 is located near the level of the hub of the rotor and the entire wall is covered by the cover part of the device. The edges of wall 30 abut, or substantially abut, the wall 10 and the cover part 16.

The device shown is of much greater height and width than its fore and aft depth. Air entering the side inlet, which is of much smaller area than the opening at the front of the device and of much less vertical height than the latter opening, will be deflected by wall 30 and follow the course indicated by the arrows A' (Figure 3) and be directed downward to the rotor at the left of the axis of the rotor (as the device is viewed from the front) and thus partly counteract the effect of the air flowing across the open face of the device in the direction of the arrows A (Figure 1), and thereby retard the speed of rotation at which any given air pressure would otherwise drive the rotor. Air following the course A' finally flows out of the casing at the left hand side of the opening in the front face of the casing. As the force of the air flowing along the course A increases, the counteracting force of the air flowing along the course A' will automatically increase.

The device shown is further provided with means manually adjustable to vary the retarding effect of air flowing along course A', said means being also coactive with the deflector wall 30 to assist it in causing air to flow closely along said wall 30 in the course indicated by arrows A'. To these ends, a combined deflector and gate is mounted in the rear part of the device for sliding adjustment up and down therein to variably partially close the air inlet through the right hand edge of the device. This adjustable deflector and inlet closing gate comprises a rigid and flat strip of metal bent transversely to provide a deflector portion 32 and a gate portion 33, the width of this strip corresponding to, or substantially to, the height of the edge wall 14. The gate portion 33 is straight and is slidably adjustable along and releasably held flatwise against the inner face of wall 14. Gate portion 33 has a longitudinal slot 34.

To clamp the device 32—33 in different vertically adjusted positions, a clamping screw 35 has its shank passed inward through a hole 36 in wall 14 and through slot 34 and threaded at its inner end in a threaded hole 37 in a clamping block 38 with part 33 clamped between said wall and block. The deflector part 32 extends inward preferably nearly half way to the deflector wall 30 as shown, and serves to cause the air entering the edge air inlet to closely follow wall 30 to the left hand side of the device. The device 32—33 can be adjusted to leave the edge air inlet of the device fully open or to variably shut off or close said air inlet.

It will be obvious that the coactive stationary and movable signs may depict other things or parts thereof than those shown.

Although I have thus described my invention in its preferred form, as required by the patent statutes, I desire to be limited only by the scope of the appended claims.

I claim:

1. An advertising device comprising a wind current rotative sign having a set of impelling blades drivingly connected therewith, said sign having a perimetrical edge and oppositely directed display and back faces bounded by said edge, said blades being located at the back face of said sign with the several blades substantially radially arranged about an axis of rotation passing centrally through said sign faces and with all of said blades similarly angularly disposed widthwise of each blade to the back face of said sign and entirely covered at one face of the set of blades by said sign, a tray-like housing within the interior of which said sign is mounted for continuous rotation about the aforesaid axis, said housing being at least substantially completely closed behind and also perimetrically around the field of rotation of said rotative sign and its connected set of impelling blades to direct facewise and edgewise entry of wind currents into the housing, and an outwardly facing sttaionary sign which is located opposite the display face of said rotative sign and which closes said housing at the front of said rotative sign to facewise entry and exit of wind currents at one side of a substantially straight line extending approximately diametrically of said rotative sign, whereby a portion of a wind current directed at said housing longitudinally of said line will enter and leave the housing at the opposite side of said line and rotate the rotative sign.

2. An advertising device, as claimed in claim 1, wherein said housing has means adjustable to admit edgewise of the housing behind said stationary sign a regulative cross-section of a wind current directed at said housing in one direction longitudinally of said line.

3. An advertising device, as claimed in claim 1, wherein said housing, said stationary sign and said rotative sign are formed of opaque material.

4. An advertising device, as claimed in claim 3, wherein said rotative sign is shaped to provide three like simulations of a leg of a biped which are substantially radially arranged and equally spaced about the axis of rotation of said sign, and wherein said stationary sign depicts the same biped without legs and with the body of said biped arranged for coaction with said rotative sign to simulate said biped with its legs in motion during rotation of said rotative sign.

IRA E. SWART.

REFERENCES CITED

The following references are of record in the file of this patent:

UNITED STATES PATENTS

| Number | Name | Date |
|---|---|---|
| 1,106,588 | Schnitzler et al. | Aug. 11, 1914 |
| 1,532,319 | Klingelhoffer | Apr. 7, 1925 |
| 1,642,906 | Suggs | Sept. 20, 1927 |
| 1,973,223 | O'Brien | Sept. 11, 1934 |
| 2,007,684 | Kull | July 9, 1935 |
| 2,084,855 | Macaulay | June 22, 1937 |
| 2,093,710 | Conley | Sept. 21, 1937 |

FOREIGN PATENTS

| Number | Country | Date |
|---|---|---|
| 141,509 | Switzerland | Dec. 1, 1930 |